US005352731A

United States Patent [19]

Nakano et al.

[11] Patent Number: 5,352,731

[45] Date of Patent: Oct. 4, 1994

[54] THERMALLY CONDUCTIVE SILICONE RUBBER COMPOSITION CONTAINING ORGANO POLYSILOXANES WITH HIGH AND LOW POLYMERIZATION DEGREES AND SPHERICAL ALUMINUM OXIDE POWDER

[75] Inventors: Akio Nakano; Tsutomu Yoneyama, both of Annaka; Nobumasa Tomizawa, Harunamachi, all of Japan

[73] Assignee: Shin-Etsu Chemical Co., Ltd., Tokyo, Japan

[21] Appl. No.: 114,227

[22] Filed: Sep. 1, 1993

Related U.S. Application Data

[63] Continuation of Ser. No. 873,147, Apr. 24, 1992, abandoned.

[30] Foreign Application Priority Data

Apr. 26, 1991 [JP] Japan .................................. 3-124755

[51] Int. Cl.[5] .......................... C08J 5/10; C08K 3/10; C08L 83/08

[52] U.S. Cl. .................................... 524/786; 524/430; 524/858; 524/860; 524/437

[58] Field of Search ............... 524/430, 786, 858, 860, 524/437

[56] References Cited

U.S. PATENT DOCUMENTS 4,355,129 10/1982 Dams .................................. 524/435

4,444,944 4/1984 Matsushita et al. ................. 524/786

*Primary Examiner*—Paul R. Michl

*Assistant Examiner*—U. K. Rajguru

*Attorney, Agent, or Firm*—Millen, White, Zelano, & Branigan

[57] ABSTRACT

A silicone rubber composition having thermal conductivity higher than $5\times10^{-3}$ cal/cm·sec·°C. and excellent workability in various molding processes, which comprises A) 95–50 parts by weight of an organopolysiloxane having an average polymerization degree of 6,000–12,000, B) 5–50 parts by weight of an organopolysiloxane having an average polymerization degree of 200–2,000, C) 500–1,200 parts by weight of a spherical aluminum oxide powder and D) a curing agent ample for curing the composition consisting of A) to C) .

18 Claims, No Drawings

THERMALLY CONDUCTIVE SILICONE RUBBER COMPOSITION CONTAINING ORGANO POLYSILOXANES WITH HIGH AND LOW POLYMERIZATION DEGREES AND SPHERICAL ALUMINUM OXIDE POWDER

This application is a continuation of application Ser. No. 07/873,147, filed Apr. 24, 1992, now abandoned.

FIELD OF THE INVENTION

The present invention relates to a silicone rubber composition which has high thermal conductivity as well as excellent moldability in molding, extrusion, calendering and like processes and, more particularly, to a silicone rubber composition which is well suited for electric insulating thermal conductive sheets used in fixing exothermic elements on a heat sink or metallic chassis.

BACKGROUND OF THE INVENTION

Since exothermic elements such as power transistor, thyristor, rectifier, transformer, power MOS FET and the like suffer from deterioration of their characteristics or, in the worst case, break down due to their generating heat, a means of conducting heat, such as fitting them with a heat sink or mounting them on a metallic chassis, has so far been taken in installing them. Therein, a sheet-form thermal conductive electric insulating material has generally been laid between an exothermic element and a heat sink with the intention of heightening electric insulating capacity and thermal conductive efficiency.

As for the thermally conductive electric insulating material as described above, silicone rubber compounded with beryllium oxide, aluminum oxide, aluminum hydroxide, magnesium oxide, zinc oxide or the like has been known (for the details of which Japanese Kokai Koho (Unexamined Publication) No. 47-342400 can be referred to).

However, thermally conductivity of such a thermal conductive, electrical insulating material as cited above was $4'10^{-3}$ cal/cm·sec °C. at the highest, and filling such a material with a large quantity of thermal conductivity-providing powder for improvement on the thermal conductivity caused serious deterioration in moldability.

On the other hand, using boron nitride, which is excellent in thermal conductivity, made it feasible to increase the thermal conductivity of compounded silicone rubber up to $5\times10^{-3}$ cal/cm·sec ·°C. or higher. However, the silicone rubber compounded with boron nitride was low in strength under uncured condition (green strength), so that it was poor in moldability. Even after it was cured, the strength thereof was so low that reinforcement with glass cloth or the like was required. Accordingly, it was difficult to make moldings of any other form than that of sheet. Moreover, it had a disadvantage that the ratio of raw material cost to production cost was high due to expensiveness of boron nitride.

As another thermally conductive electric insulating material, silicone rubber filled with a large quantity of spherical aluminum oxide powders has been known (for the details of which Japanese Kokoku Koho (Examined Publication) No. 58-22055 and Japanese Kokai Koho No. 64-69661 can be referred to). However, on the occasion that aluminum oxide powders were compounded in an amount of 500 parts by weight or more, the moldability of the resulting silicone rubber was lowered even when aluminum oxide powders differing in size distribution were used in combination. Under such a condition, it was difficult in particular to perform calendering and extrusion molding.

With the recent advance of miniaturization of various kinds of apparatuses, the number of elements covered with an insulating material has been increased, and in proportion thereto it has acquired importance to shorten an insulating creeping distance of exothermic elements. Therein, tubular or case-form insulating thermally conductive moldings have been used, so that moldability of thermally conductive silicone rubber compounds has been an important point.

Under these circumstances, we have pursued intensive studies of thermally conductive, electric insulating materials excellent in moldability. As a result, it has been found that silicone rubber can be filled with 500 parts by weight or more of a spherical aluminum oxide powder when the combination of an organopolysiloxane having a high degree of polymerization and that having a low degree of polymerization is used as the basis to be compounded and thereby it becomes feasible to obtain a thermal conductive silicone rubber composition having thermal conductivity of $5\times10^{-3}$ cal/cm·sec·°C. or higher and excellent moldability, thus achieving the present invention.

SUMMARY OF THE INVENTION

Therefore, a first object of the present invention is to provide a thermally conductive silicone rubber composition which exhibits excellent moldability in molding, extrusion or calendering.

A second object of the present invention is to provide a thermally conductive silicone rubber composition which is low in production cost as well as excellent in moldability.

A third object of the present invention is to provide a thermally conductive silicone rubber composition which is cheap, and can acquire excellent weather resistance and heat resistance when it is cured.

The above-described objects of the present invention are attained with a thermally conductive silicone rubber composition which comprises A) 95–50 parts by weight of an organopolysiloxane having an average polymerization degree of 6,000–12,000, B) 5–50 parts by weight of an organopolysiloxane having an average polymerization degree of 200–2,000, C) 500–1,200 parts by weight of a spherical aluminum oxide powder and D) a curing agent ample for curing the composition consisting of A) to C), and has thermal conductivity of $5\times10^{-3}$ cal/cm·sec.·°C. or higher In accordance with an embodiment of the present invention, the thermally conductive silicone rubber composition contains as the basis thereof a combination of an organopolysiloxane having a high polymerization degree with that having a low polymerization degree and uses a spherical aluminum oxide powder as a compounding ingredient, so that not only high thermal conductivity beyond $5\times10^{-3}$ cal/cm·sec·°C. can be achieved by increasing an amount of the alumin as thermally conductive filler beyond 500 parts by weight, but also excellent workability in mold, calender, extrusion and other molding processes can be acquired.

In addition, the thermally conductive silicone composition of the present invention is lower in production cost than thermally conductive materials utilizing boron nitride although they all are almost equal in thermal conductivity. Moreover, the cured composition of the present invention can acquire extremely high weather resistance and heat resistance on the occasion that spherical aluminum oxide powder produced by melting metallic aluminum and oxidizing it with oxygen is used as the component C).

DETAILED DESCRIPTION OF THE INVENTION

It is desirable that organopolysiloxanes used as the component A) or B) in the present invention should be those represented by an average compositional formula, $R_n\,Si\,O_{(4-n)/z}$ (wherein n is a positive number ranging from 1.95 to 2.05, and R is a monovalent substituted or unsubstituted hydrocarbon residue).

Specific examples of R include alkyl groups such as methyl, ethyl, propyl, etc., cycloalkyl groups such as cyclopentyl, cyclohexyl, etc., alkenyl groups such as vinyl, allyl, etc., aryl groups such as phenyl, tolyl, etc., and halogenated hydrocarbon residues formed by partly replacing hydrogen atoms of the above-cited groups by chlorine, fluorine or like atom(s).

Among these organopolysiloxanes, those having the main chain constituted by dimethylsiloxane units, to which vinyl, phenyl, trifluoropropyl or like groups may be introduced, are preferred over others.

As for the organopolysiloxane usable as the component A) in the present invention, gutroy ones having an average polymerization degree of 6,000–12,000, preferably 7,000–10,000, which have been used for conventional silicone rubber compounds, can be given as examples.

When the organopolysiloxane of the component A) has a polymerization degree of 6,000 or less, it causes a lowering of strength of the silicone rubber compound in the uncured condition (green strength) to deteriorate workability in roll or calender molding. When the polymerization degree is increased beyond 12,000, on the other hand, the silicone rubber basis becomes too hard to fill it with a large quantity of aluminum oxide powder.

An organopolysiloxane used as the component B) in the present invention is an oily matter having an average polymerization degree of 200–2,000 and a viscosity of 600–120,000 centistokes. This component softens the silicone rubber basis to enable the high density filling with aluminum oxide powder. When the polymerization degree is below 200 the green strength is lowered, whereas when it is beyond 2,000 the basis becomes too hard.

From the standpoints of green strength and high density filling with aluminum oxide powder, it is necessary to control a mixing ratio of the component A) to the component B) within the range of 95/5 to 50/50.

The expression "spherical aluminum oxide powder" used for the component C) is intended to include all of aluminum oxide particles free from angular parts. The absence of angular parts at the filler particle surface is an essential requirement for high density filling of the silicone rubber basis. The closer to a sphere the shape of aluminum oxide particles, the easier high density filling therewith.

An amount of the aluminum oxide powder compounded is in the range of 500 to 1,200 parts by weight. When the amount compounded is below 500 parts by weight, it is impossible to increase the thermal conductivity up to $5\times10^{-3}$ cal/cm·sec·°C. or higher, whereas when it is beyond 12,000 parts by weight the resulting composition is poor in moldability and inferior in mechanical strength to be acquired by curing. In addition, it is desirable that the above-described spherical aluminum oxide powder should have an average particle size of 50 μm or less and such a spherical shape as to have an major axis diameter/minor axis diameter ratio ranging from 1.0 to 1.4 in average. When the average particle size is 50 μm or above, moldings formed by an extrusion or calendering operation are inferior in moldability and fail to provide a smooth surface.

The spherical aluminum oxide powder of the component C) are not particularly restricted by preparation method. Any preparation method, including Bayer method, an electromelting method, a sintering method and so on, may be employed. However, the preparation method disclosed in Japanese Kokai Koho No. 52-15498 is preferred in respect that the shape of the powder obtained is close to a sphere and free from angular parts.

In particular, an aluminum oxide powder obtained by oxidizing molten metallic aluminum by direct contact with oxygen (as disclosed in Japanese Kokai Koho No. 02-199004) is high in sphericity and very low in content of impurities including alkali ions and halogen ions. More specifically, the content of impurities extracted under the condition of 121° C., 2 atmospheres and 100% RH is below 5 ppm.

Consequently, the foregoing aluminum oxide powder has no bad influence upon organopolysiloxane polymers even under high temperature or/and high humidity conditions, so that when the silicone rubber basis compounded with said aluminum oxide powder is cured, it can produce especially improved weather resistance and heat resistance. As an example of such a favorable aluminum oxide powder, high purity alumina produced by Admatechs Co. can be given.

A curing agent to be used as component D) in the present invention can be chosen properly from known ones which have been used for curing conventional silicone rubbers. Suitable examples thereof include organic peroxides used for radical reactions, such as di-t-butyl peroxide, 2,5-dimethyl-2,5-di ( t-butylporoxy ) hexane, 2,4-dichlorobenzoyl peroxide, dicumyl peroxide, etc.; and those functioning through addition reaction, such as mixtures of organohydrogenpolysiloxanes, which contain at least two silicon-bonded hydrogen atoms per molecule, with platinch catalysts. An optimum amount of the curing agent adopted can be determined in analogy with the case of known silicone rubbers.

The present composition comprising components A) to D) can contain various additives, if desired. Such additives include reinforcing silica fillers such as silica hydrogel (hydrous silicate), silica aerosol (anhydrous silicate-aerosol silica), etc.; thermal conductivity providing fillers such as magnesium oxide, zinc oxide, silicon carbide, silicon nitride, aluminum nitride, boron nitride, quartz, etc.; extenders such as clay, calcium carbonate, diatomaceous earth, titanium dioxide, etc.; dispersants such as low molecular weight siloxane esters, silanols, etc.; heat resistance improvers such as iron oxides, cerium oxides, iron octanoate, etc.; coloring agents such as inorganic and organic pigments; platinum compounds functioning as as flame retarder; polytetrafluoroethylene particles capable of heightening green strength of compounded rubbers, and so on. However, it is necessary to add these additives in such an amount as not to exert adverse effects upon moldability of the present compositions.

The composition of the present invention can be prepared with ease by kneading the foregoing components A) to D) and optionally used additives with a mixing means, such as a two-roller mill, a kneader, Banbury mixer, etc. In general, it is desirable to prepare then in a process which comprises kneading an organopolysiloxoane component, a reinforcing silica filler and a dispersant under heating to prepare a silicone rubber base, mixing the silicone rubber base with a spherical aluminum oxide powder, and adding a curing agent to the mixture just before use.

The thus prepared thermally conductive silicone rubber composition can be worked into moldings of various forms, as well as those of a sheet form, using a press, transfer, extrusion, injection, calendering, coating or another molding technique.

EXAMPLES

The present invention will now be illustrated in greater detail by reference to the following examples. However, the invention should not be construed as being limited to these examples.

Additionally, evaluation of thermally conductive silicone rubber compounds were made by undergoing the following tests.

1) Compounding Capability

An aluminum oxide powder wins admixed with a silicone rubber base by means of a two-roller mill, and examined as to whether it can be compounded with the silicone rubber base as the base wound round the roller.

2 ) Tackiness

After a silicone rubber base was compounded with the whole amount of an aluminum oxide powder to be added, the resulting silicone rubber compound was examined as to whether it was able to be easily peeled off the roller surface.

3) Calendering Processability

A silicone rubber compound was made into 0.4 ram-thick sheet by the calendering process using a two-roller mill, and then a 0.1 mm-thick PET film having an embossed surface was passed between the two rollers. As a result of this operation, the compound sheet wound round the roller was examined as to whether it was transferred onto the embossed surface of the PET film from the roller.

4) Thermal Conductivity

A silicone rubber compound was formed into a test piece measuring 9 mm in thickness and 50 mm in diameter, and the thermal conductivity thereof was measured with an instrument on the market, C-Matic Conductance Tester ( trade name, products of Dynatech Co. ).

EXAMPLE 1

A silicone rubber base was prepared using as the component A) 80 parts by weight of methylvinylpolysiloxane which was constituted by 99.85 mol% of dimethylsiloxane units and 0.15 mol% of methylvinylsiloxane units and had an average polymerization degree of 8,000 and as the component B) 20 parts by weight of dimethylpolysiloxane which was blocked by dimethylvinylsiloxy group at the both ends and had an average polymerization degree of 1,700, and admixed with 600 parts by weight of a spherical aluminum oxide powder, Adma Fine Alumina A-40H (trade name, products of Admatechs Co., having an average major axis diameter/minor axis diameter ratio of 1.1 and an average particle size of 10 μm), as the component C) by means of a two-roller mill.

A 100 parts by weight portion of the thus prepared rubber compound was further admixed with 1.0 part by weight of an organic peroxide as the component D) , C-2 (trade name, products of Shin-Etsu Chemical Co., Ltd.), by means of the two-roller mill, and then subjected to a press-molding operation under a temperature of 120° C. and a pressure of 50 Kgf/cm$^2$. Thereafter, the pressed rubber compound was heated in a drying oven at 200° C. for 4 hours to prepare a sample for thermal conductivity measurement. The thus obtained thermally conductive silicone rubber compound was examined for the above-described characteristics, and the results obtained are shown in Table 1.

EXAMPLE 2

Another sample was prepared in the same manner as in Example 1, except fist said spherical aluminum oxide powder, Adma Fine Alunina AO-40H, was used in an amount of 800 parts by weight instead of by weight, and examined for the required characteristics. The results obtained are also shown in Table 1.

EXAMPLE 3

A silicone rubber base was prepared using as the component A) 60 parts by weight of methylvinylpolysiloxane which was constituted by 99.85 tool% of dimethylsiloxane units and 0.15 mol % of methylvinylsiloxane units and had an average pollanerization degree of 10,000 and as the component B) 40 parts by weight of dimethylpolysiloxane which was blocked by dimethylvinylsiloxy group at the both ends and had an average polymerization degree of 300, and admixed with 800 parts by weight of a spherical aluminum oxide powder, Adma Fine Alumina A-40H, as the component C) by means of a two-roller mill.

A 100 parts by weight portion of the thus prepared rubber compound was further admixed with 1.0 part by weight of an organic peroxide, C-2, as the component D) by means of the two-roller mill, and then subjected to the same treatments as in Example 1 to make a sample therefrom. The obtained sample was examined for the required characteristics, and the results obtained are also shown in Table 1.

EXAMPLE 4

A further sample was prepared in the same manner as in Example 3, except that said spherical aluminum oxide powder, Adma Fine Alumina AO-40H, was used in an amount of 1,000 parts by weight instead parts by weight, and examined for the required characteristics. The results obtained are also shown in Table 1.

COMPARATIVE EXAMPLE 1

Still another sample was prepared in the same manner as in Example 1, except that said Adma Fine Alunina AO-40H was reduced in amount used to 450 parts by weight from 600 parts by weight, and examined for the required characteristics. The results obtained are also shown in Table 1.

COMPARATIVE EXAMPLE 2

The same procedures as in Example 1, except that said Adma Fine Alumina AO-40H was increased in amount used to 1,300 parts by weight from 600 parts by weight, and examined for the characteristics described above, were followed. However, the alumina powder failed in satisfactory compounding with the basis, so that the resultant matter was not worth examining.

COMPARATIVE EXAMPLE 3

A further sample was prepared in the same manner as in Example 1, except that the components A) and B) were used in amounts of 45 parts by weight and 55 parts by weight, respectively, in preparing the base, and the resultant base was admixed with 800 parts by weight of Adma Fine Alumina AO-40H as the component C), and examined for the required characteristics. The results obtained are also shown in Table 1.

EXAMPLES 5 TO 7, AND COMPARATIVE EXAMPLE 4

100 parts by weight of the same base as used in Example 1, 20 parts by weight of a silica fine powder having a specific surface area of 200 $m^2/g$, Aerosil 200 (trade name, products of Nippon Aerosil Co.), and 5 parts by weight of $\alpha,\omega$-dihydroxydimethylpolysiloxane of the formula, $HO-(Si(CH_3)_2—O)_{10}$, were kneaded homogeneously with a kneader and heated at 150° C. for 2 burs. The resultant totter was divided into 4 portions, and they were further admixed with different aluminum oxide powders set forth in Table 2, respectively, by means of the two-roller mill. The amount of each powder compounded was 800 parts by weight per 100 parts by weight of the silicone rubber base.

Furthermore, a 100 parts by weight portion of each compounded rubber was admixed, in armlogy with Example 1, with 1.0 part by weight of an organic peroxide, C-2, by means of the two-roller mill. The thus prepared samples were examined for the required characteristics following the same procedures as in Example 1. The results obtained are shown in Table 3.

Heat Resistance Test

The thermal conductive silicone rubber compounds prepared in Example 6 and Example 7 were each formed into a 0.4 mm-thick sheet using a two-roller mill, transferred onto a 0.1 ram-thick PET film, and then cured by 10 minutes' heatlag in a 150° C. drying oven. Thereafter, the cured silicone rubber sheets each were peeled apart from the PET film, and heated at 200° C. for 4 hours.

Further, the resultant sheets each were heated for 500 hours in a 200° C. drying oven, and examined for changes in characteristics. The results obtained are shown in Table 4.

It is confirmed from the data set forth in Table 4 that the heat resistance of the silicone rubber compound can be improved by the use of aluminum oxide prepared by direct oxidation of molten metallic aluminum with oxygen, or Adma Fine Alunina, as the component C).

TABLE 1

| | Example | | | | Comparative Example | | |
|---|---|---|---|---|---|---|---|
| | 14 | 15 | 16 | 17 | 1 | 2 | 3 |
| Compounding Capability | good | good | good | average | good | bad | average |
| Tackiness | good | good | good | average | average | — | bad |
| Calendering Processability | good | good | good | average | average | — | bad |
| Thermal Conductivity (cal/cm · sec · °C.) | $6.5 \times 10^{-3}$ | $9.2 \times 10^{-3}$ | $8.9 \times 10^{-3}$ | $10.5 \times 10^{-3}$ | $4.5 \times 10^{-3}$ | — | $8.6 \times 10^{-3}$ |

TABLE 2

| | Example | | | Comparative Example |
|---|---|---|---|---|
| | 5 | 6 | 7 | 4 |
| Trade name | AS-10 | AS-30 | AO-40H | AL-24 |
| Maker | Showa Denko Ltd. | Showa Denko Ltd. | Admatechs Ltd. | Showa Denko Ltd. |
| Average particle size | 37 μm | 16 μm | 10 μm | 5 μm |
| Shape | roundish | roundish | spherical | tabular |
| Major aix diameter/ Minor aix diamater ratio | 1.3 | 1.3 | 1.1 | 1.5 |

TABLE 3

| | Example | | | Comparative Example |
|---|---|---|---|---|
| | 5 | 6 | 7 | 4 |
| Compounding Capability | good | good | good | bad |
| Tackiness | average | good | good | — |
| Calendering Processability | average | average | good | — |
| Thermal Conductivity (cal/cm · sec · °C.) | $7.2 \times 10^{-3}$ | $7.4 \times 10^{-3}$ | $7.7 \times 10^{-3}$ | — |

TABLE 4

| | Example 6 | | Example 7 | |
|---|---|---|---|---|
| | initial stage | 500-hours heating | initial stage | 500-hours heating |
| Hardness (JIS) | 90 | 95 | 87 | 92 |
| Elongation (%) | 55 | — | 70 | 45 |
| Tensile Strength ($Kgf/cm^2$) | 51 | — | 55 | 58 |

What is claimed is:

1. A thermally conductive silicone rubber composition having thermal conductivity of $5\times10^{-3}$·cal/cm·sec·°C. or higher which consists essentially of A 95-50 parts by weight of a gummy organopolysiloxane having an average polymerization degree of 6,000-12,000, B) 5-50 parts by weight of an oily organpolysiloxane having an average polymerization degree of 200-2,000 and a viscosity of 600 to 120,000 centistokes, C) 500-1,200 parts by weight of a spherical aluminum oxide powder having an average particle size of 50 μum or less and an average major axis diameter/minor axis diameter ratio of 1.0 to 1.4, and D) a curing agent in an amount sufficient to cure the composition.

2. The thermally conductive silicone rubber composition of claim 1, wherein said organopolysiloxane of component A) is represented by an average compositional formula, $R_nSi\,O_{(4-n)/z}$, wherein R is a monovalent substituted or unsubstituted hydrocarbon residue, and n is an positive number ranging from 1.95 to 2.05.

3. The thermally conductive silicone rubber composition of claim 2, wherein the main chain of said organopolysiloxane comprises dimethylsiloxane units.

4. The thermally conductive silicone rubber composition of claim 3, wherein part of the methyl groups of said main chain are replaced by vinyl groups, phenyl groups, trifluoropropyl groups or combinations thereof.

5. The thermally conductive silicone rubber composition of claim 2, wherein said monovalent hydrocarbon residue represented by R is an unsubstituted alkyl group, a halogenated alkyl group, an unsubstituted cycloalkyl group, a halogenated cycloalkyl group, an unsubstituted alkenyl group, a halogenated alkenyl group, an unsubstituted aryl group, a halogenated aryl group or combinations thereof.

6. The thermally conductive silicone rubber composition of claim 5, wherein said alkyl group is methyl, ethyl or propyl, said cycloalkyl group is cyclopentyl or cyclohexyl, said alkenyl group is vinyl or allyl, and said aryl group is phenyl or tolyl.

7. The thermally conductive silicone rubber composition of claim 5, wherein the halogen of said halogenated groups is chlorine or fluorine.

8. The thermally conductive silicone rubber composition of claim 1, wherein said organopolysiloxane of component B) is represented by an average compositional formula, $R_n\,Si\,O_{\,4-n)/z}$ wherein R is a monovalent substituted or unsubstituted hydrocarbon residue, and n is a positive number ranging from 1.95 to 2.05.

9. The thermally conductive silicone rubber composition of claim 8, wherein the main chain of said organopolysiloxane comprises dimethylsiloxane units.

10. The thermally conductive silicone rubber composition of claim 3, wherein part of the methyl groups of said main chain are replaced by vinyl groups, phenyl groups, trifluoropropyl groups or combinations thereof.

11. The thermally conductive silicone rubber composition of claim 2, wherein said monovalent hydrocarbon residue represented by R is an unsubstituted alkyl group, a halogenated alkyl group, an unsubstituted cycloalkyl group, a halogenated cycloalkyl group, an unsubstituted alkenyl group, a halogenated alkenyl group, an unsubstituted aryl group, a halogenated aryl group or combinations thereof.

12. The thermally conductive silicone rubber composition of claim 11, wherein said alkyl group is methyl, ethyl or propyl, said cycloalkyl group is cyclopentyl group or cyclohexyl, said alkenyl group is vinyl or allyl, and said aryl group is phenyl or tolyl.

13. The thermally conductive silicone rubber composition of claim 11, wherein the halogen of said halogenated groups is chlorine or fluorine.

14. The thermally conductive silicone rubber composition of claim 1, wherein the mixing ratio of said component A) to said component B) ranges from 95/5 to 50/50.

15. The thermally conductive silicone rubber composition of claim 1, wherein said spherical aluminum oxide powder of component C) is an aluminum oxide powder prepared by process comprising a step of melting metallic aluminum and a step of oxidizing molten metallic aluminum with oxygen.

16. A curable silicone rubber article produced by molding a thermally conductive silicone composition of claim 1.

17. A cured silicone rubber article produced by heat curing an article of claim 16.

18. The silicone rubber article of claim 17 in the form of a sheet.

* * * * *